L. SCHÖN.
CONNECTION FOR CONTINUOUS CURRENT GENERATORS.
APPLICATION FILED FEB. 3, 1913.

1,147,123.

Patented July 20, 1915.

UNITED STATES PATENT OFFICE.

LUDWIG SCHÖN, OF ESSEN-ON-THE-RUHR, GERMANY, ASSIGNOR TO FRIED. KRUPP AKTIENGESELLSCHAFT, OF ESSEN-ON-THE-RUHR, GERMANY.

CONNECTION FOR CONTINUOUS-CURRENT GENERATORS.

1,147,123.  Specification of Letters Patent. Patented July 20, 1915.

Application filed February 3, 1913. Serial No. 746,024.

*To all whom it may concern:*

Be it known that I, LUDWIG SCHÖN, residing at Essen-on-the-Ruhr, Germany, a subject of the Emperor of Germany, have invented a certain new and useful Improvement in Connections for Continuous - Current Generators, of which the following is a specification.

The subject matter of the present invention is a connection for continuous current generators, particularly intended for controlling dynamos with Leonard-driving, which provides the advantage, that a very short time of excitation and at the same time a very effective destruction of the residual magnetism may be attained in an extremely simple manner.

Two embodiments of the invention are illustrated in the accompanying drawing, where—

Figure 1:
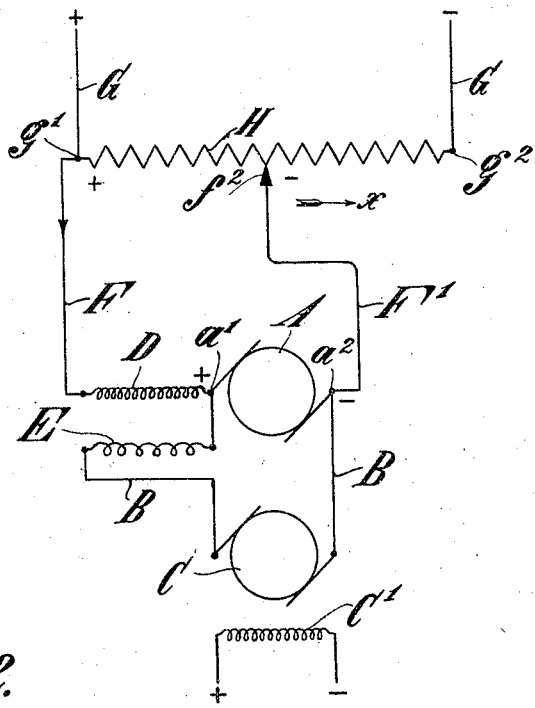
Figure 2:
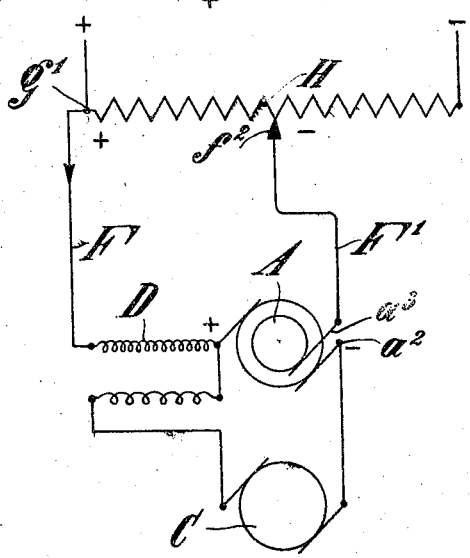

Figure 1 gives a diagrammatic representation of the connection and Fig. 2 a modified form of the connection.

The connection shown in Fig. 1 will be first described.

A designates the rotor of a continuous current generator which is represented as a controlling dynamo of a so called Leonard drive. The rotor C of the corresponding continuous current motor is, by means of the conductor B connected with the clamps $a^1$ and $a^2$ of the rotor A, the field winding $C^1$ of the former rotor C being separately excited in well known manner. The generator is provided with a main field winding D and a compound winding E. The main field winding D is, on the other hand, by means of a conductor F connected with that clamp $g^1$ of a continuous current net work G, which has similar polarity with the clamp $a^1$.

Between the clamp $g^1$ and the other clamp $g^2$ of the net work G, is inserted a regulating resistance H, to which the rotor clamp $a^2$ may be connected by means of a conductor $F^1$ ending in a sliding contact $f^2$, so that either the whole resistance H or only a part thereof is introduced into the circuit A, D, F, H, $F^1$ or on the other hand the rotor A and the field winding D are short circuited through the conductor F and $F^1$. In the first case, wherein the sliding contact $f^2$ stands in direct connection with the clamp $g^2$, the whole voltage formed by the net work G which constitutes the voltage source, is inserted into the circuit A, D, F, H, $F^1$. By means of corresponding adjustment of the sliding contact $f^2$ the inserted voltage may be diminished as required until the sliding contact $f^2$ stands in direct connection with the clamp $g^1$ when it will be equal to zero. As, in the state of permanence, the exciting voltage for the field winding D cannot exceed the difference between the full net work voltage and the highest value of the clamping voltage of the rotor A, the computation of the measurement of the field winding D should therefore naturally be based on this difference, which is considerably lower than the highest value of the clamping voltage of the generator rotor A. This circumstance possesses the advantage that the resistance of the field winding D, as well as the number of windings, and as a consequence also the self-induction will be found comparatively small.

When the motor C $C^1$ stands idle the sliding contact $f^2$ is in direct connection with the clamp $g^1$ of the net work G. The rotor A and the field winding D are also short circuited. In order to start the motor the sliding contact $f^2$ is drawn in the direction of the arrow $x$ until it reaches that position (as represented in the drawing), which corresponds to the desired number of revolutions of the motor. A fraction of the net work voltage which corresponds to the position of the sliding contact $f^2$ is now inserted in the circuit H, F, D, A, $F^1$, and there will consequently arise a current therein, which will flow through the field winding D in the direction of the arrow shown on the drawing. As has already been mentioned, the field winding D only possesses comparatively low self-induction, the current attains very quickly its full strength; the time necessary for the complete excitation of the generator will therefore be very short.

To stop the motor C $C^1$ the circuit H F D A $F^1$ should be short circuited by connecting the sliding contact $f^2$ directly with the clamp $g^1$, so that the voltage source G is disconnected. The rotor voltage which counter-acts the exciting current during the state of permanence further exist for a moment longer as a consequence of the self-induction of the main field winding D and by the influence of the compound winding E, and it will generate a current in the short circuited circuit, which has the opposite direction to the exciting current produced in the state of permanence. In consequence of this a power field will be generated in the magnet frame of the generator by means of which the residual magnetism will be quickly and completely removed.

The embodiment of this invention illustrated in Fig. 2 differs from the one described, only therein that the conductor $F^1$ in said figure is not connected to the rotor clamp $a^2$ but instead to the intermediate brush $a^3$ in the manner of the well known Sengel connection, so that in the circuit H F D A $F^1$ always only a fraction, practically one half, of the rotor voltage generated through the induction action in the rotor, is opposed to the voltage existing between the clamp $g^1$ and the sliding contact $f^2$, and that therefore the half of the rotor voltage need be smaller than the net work voltage. The total rotor voltage may therefore be accepted as greater than the same in the first embodiment of the invention wherein it is always to be selected to be smaller than the net work voltage. The use of the Sengel connection possesses then a particular advantage as compared for instance with a voltage division through throttling of a rotor voltage in a resistance connected in parallel to the rotor, whereby the counter-current, acting to destroy the residual magnetism, will be found considerably stronger during the short circuiting of the main field winding D.

Without changing the object of the invention, the field winding D and the conductor $F^1$ may be connected to the rotor C of the motor instead of to the rotor A of the generator, and in this case the conductor $F^1$ might be connected in Sengel connection by a special intermediate brush with the rotor C of the motor.

I claim:

1. A continuous current generator having an exciting circuit containing in series the armature of the generator, a main field winding, and a source of external voltage, said source being connected so as to act in opposition to the voltage of said armature; and means for adjusting the amount of external voltage to be inserted in the exciting circuit from naught to its maximum without interrupting the exciting circuit.

2. A continuous current generator having an exciting circuit containing in series the armature of the generator, a main field winding, and a source of external voltage, said source being connected so as to act in opposition to the voltage of said armature; and means for adjusting the amount of external voltage to be inserted in the exciting circuit from naught to its maximum without interrupting the exciting circuit; the part of the exciting circuit containing said main field winding and said source of external voltage being connected to two points of said armature, between which only a fraction of the armature voltage is generated by induction.

The foregoing specification signed at Barmen, Germany, this 13th day of January, 1913.

LUDWIG SCHÖN. [L.S.]

In presence of—
ALBERT NUFER,
JULIUS FESTNER.